July 18, 1967 D. A. GOLDMAN ETAL 3,332,071
DATA RETRIEVAL AND DISPLAY SYSTEM
Filed Dec. 23, 1964 5 Sheets-Sheet 3

INVENTOR.
DAVID A. GOLDMAN
ARNOLD ZISSELMAN
BY
H.A. Mackey
ATTORNEY.

INVENTOR.
DAVID A. GOLDMAN
ARNOLD ZISSELMAN
BY
ATTORNEY.

United States Patent Office 3,332,071
Patented July 18, 1967

3,332,071
DATA RETRIEVAL AND DISPLAY SYSTEM
David A. Goldman, Yorktown Heights, and Arnold Zissel-
man, Scarsdale, N.Y., assignors to General Precision,
Inc., a corporation of Delaware
Filed Dec. 23, 1964, Ser. No. 420,581
10 Claims. (Cl. 340—172.5)

ABSTRACT OF THE DISCLOSURE

A data storage, retrieval and display system is provided that includes fixed data that is selectively retrieved and selectively viewed either in total or partial field. When viewed in partial field the degree of magnification of that portion seen is related to the fraction of the total field over the portion seen. A second form of data, variable data, is also viewed and the two forms of data are displayed in composite image of the two forms. The second form of data may be annotated while displayed with the annotation becoming part of the image of the second form of data. Selection of the second form of data is a function of the first form selected, the magnification level of the fixed data viewing means and the particular portion of the fixed data viewed.

---

The present invention relates to information display systems. In particular, the present invention constitutes an information storage, retrieval and display system in which two related forms of information or data are stored, selectively retrieved, and selectively displayed, in image, as a composite or overlay display with provision for annotating or upgrading one of the forms of information or data while displaying both forms in such composite display.

Essentially, the information includes what may be referred to as fixed data or information and variable data or information, each of which are individually stored, selectively retrieved and individually viewed and displayed in image as a composite display in overlay fashion.

Fixed data, which may be information such as a map or chart, graph, drawing, narrative and/or tabular information, may be classified generally as background or substantially permanent information and each fixed data container or chip may be coded so as to be selectively retrieved from an information storage device, bin or apparatus. Selection of such fixed data may be made manually, semiautomatically, or automatically, as by an "address" system for selective retrieval of stored information.

The fixed data may be contained or included on a microfilm frame or strip of frames, or on a film strip, with each frame normally referred to as a "chip." Such microfilm may be in the form of a slide which is in or supported in a frame or holder. Variable data may be contained or included on a transparent or translucent plate or sheet which may be substantially larger in size than the microfilm, so that the information on such container may be updated and/or annotated and/or otherwise varied, conveniently.

The principal function of the present system is interrelated with the selective viewing and display of all of a selected part of fixed data or information with the degree or factor of magnification of the fixed data related to the size of the part or portion of the fixed data viewed and displayed. Selection of the associated variable data is related to the particular part or portion of the fixed data so viewed and displayed and further related to the degree of magnification used in the display process of the fixed data. Thus, briefly, selection of the fixed data may be made a function of a coded address system or a simple index system but selection of the variable data is a function of the fixed data selected and the part or portion viewed and the factor of magnification.

Although the display of fixed data has associated therewith a variable magnification factor which is related to the portion of the total of the fixed data actually viewed and displayed, the display of variable data is at a fixed magnification factor, the latter factor related to the size of the variable data chip (which are of common size) and the size of the display means or screen on which the composite image is displayed.

Thus it will be seen that the principal function of the present display system, i.e., the composite display of fixed data and variable data with provision for updating or annotating the variable data and the selection of display of all or a selected part or section of the fixed data which is interrelated with the selection of the variable data.

The present system includes, for convenience of locating a selected portion or section of the fixed data, grid sectioning of the fixed data container or chip. The fixed data container may be in the form of a microfilm or slide or film frame which is grid sectioned as by grid coordinates so that a particular section may be selected by predetermining the field of view, as per its location on the overall or total field.

Since reduction of the field of view includes a change in magnification of the fixed data actually displayed which is inversely related to the size of the field viewed, provision is made so that selection of a reduced field of view of any one fixed data chip may be made from any one of a plurality of reduced fields of view. For example, reduction of the field of view may be made to ⅔ of the total field, ½ of the total field, ¼ of the total field, ⅙₆ of the total field, etc., according to the size of the chip and the selectivity associated with the means used to "look at" and magnify the field of view. Obviously where the field of view is reduced to ⅔ of the total field, four different sections may be used to view the total field in the reduced field of view with overlap among the various views. With the field of view reduced to ½ of the total field, two different sections may be used to cover the total field and with the field of view reduced to ¼ of the total, four different views may be used to cover the total field. Where the field of view of the fixed data has been reduced so as to view less than the total view a common magnification factor is used for reduced fields of view having a common percentage or fraction of the total field. The magnification factor employed, as between fields of view, having a different percentage or fraction of the total field, may differ.

The magnification factor values may differ substantially from one system to another since the magnification factor depends upon the size of the fixed data chip and the size of the screen of the viewing or display means.

As will be illustrated, by way of example below a view of the total field includes only one view while four views may be needed to view a field which is ⅔ of the total, having overlap of portions of the information. Two ½ field views may be used to cover or see the total field and four ¼ field views may be used to cover or see the total field, etc.

Thus it will be seen that a plurality of reduced fields of view may be provided with two or more sectional or reduced views used to cover or see the total view.

In accordance with present system a variable data chip may be associated with each individual possible view of the fixed data chip. Thus it will become obvious that if the system provides for a view of the total field of the fixed data, a ⅔ reduced field, a ½ reduced field, a ¼ reduced field and a ⅙₆ reduced field, for example, then some twenty-seven variable data chips may be associated with one fixed data chip since each possible or potential view of the fixed data chip will have associated therewith a particular variable data chip. In a less complex system one variable data chip may be associated with each fixed data chip since the variable data chip is annotatable.

It can now be seen that while the fixed data chip may have a code designation, the variable data chips may have the basic code designation of the associated fixed data chip, plus a code representing the magnification factor, which may correspond to the percentage or fraction of the total field of the fixed data chip viewed and may also include a code representing grid coordinates which correspond to the particular section of the fixed data chip so viewed, when a plurality of different variable data chips are associated with a single fixed data chip.

Observation of the fixed data chip may be made by a micro-televisor which has associated therewith adjustable, and/or preset magnification characteristics and is adjustable so as to be directed for observation of the total or a selected portion or part of the total of the fixed data. One example of a microtelevisor that may be used for such purpose is descirbed in GPL Publication No. 2019, entitled, "Television Comparator," published in November 1961, and GPL Publication No. 400, entitled "GPL . . . Microfilm Televiser and Remote Control Stick," also published in November 1961.

Observation of the variable data chip may be made by a television camera or vidicon, which is well known in the art. The display means on which the composite display or overlay display may be presented may be in the form of a television receiver or monitor into which both the microtelevisor and the vidicon are connected, through a video mixer. An example of a larger display means may include a projector and a viewing screen onto which the composite display is projected.

A storage and retrieval means, in its simplest form, may be a bin into which indexed or coded fixed data chips and variable data chips or containers are stored. When fixed data is stored on a film strip the fixed data may be coded in accordance with its location on the film strip. Retrieval may be made manually, as by reference to an index book. Semiautomatic or automatic addressable storage and retrieval means may also be used where the code of the fixed data and variable data chips correspond to an address which is actuated to effect automatic retrieval of the desired chips from the storage bin or device. In accordance with the disclosed form of storage and retrieval means, an example of an automatic selection and manual retrieval and return system is shown. However, the present invention is not intended to be limited to such storage and retrieval means shown or suggested.

It is therefore an object of the invention to provide a data or information storage and display system in which two different forms of related data are stored and selectively retrieved and individually displayed in a composite image.

Another object is to provide a data or information storage and display system in which fixed data and variable data are stored and retrieved, with selection of the variable data related to selection and display of the fixed data with the selected forms of related data displayed in overlay image.

Another object is to provide a data storage and display system for two different forms of related data in which one form of data is retrieved, selectively viewed and selectively magnified for display purposes and the selection of the second form of data is a function of the selection of the one form of data selected, the view of the total field or part thereof so viewed and the degree of magnification of the one form of data.

Another object is to provide a data storage and display system in which two related forms of data are stored and selectively viewed and displayed and the other form of related data is selectively retrieved, viewed and displayed, with both forms displayed in composite image and in which the said other form of data may be updated or annotated with the updating or annotating displayed as part of the composite image.

These and other objects will become apparent from reading the following detailed description in conjunction with the accompanying drawings in which.

Figure 1:
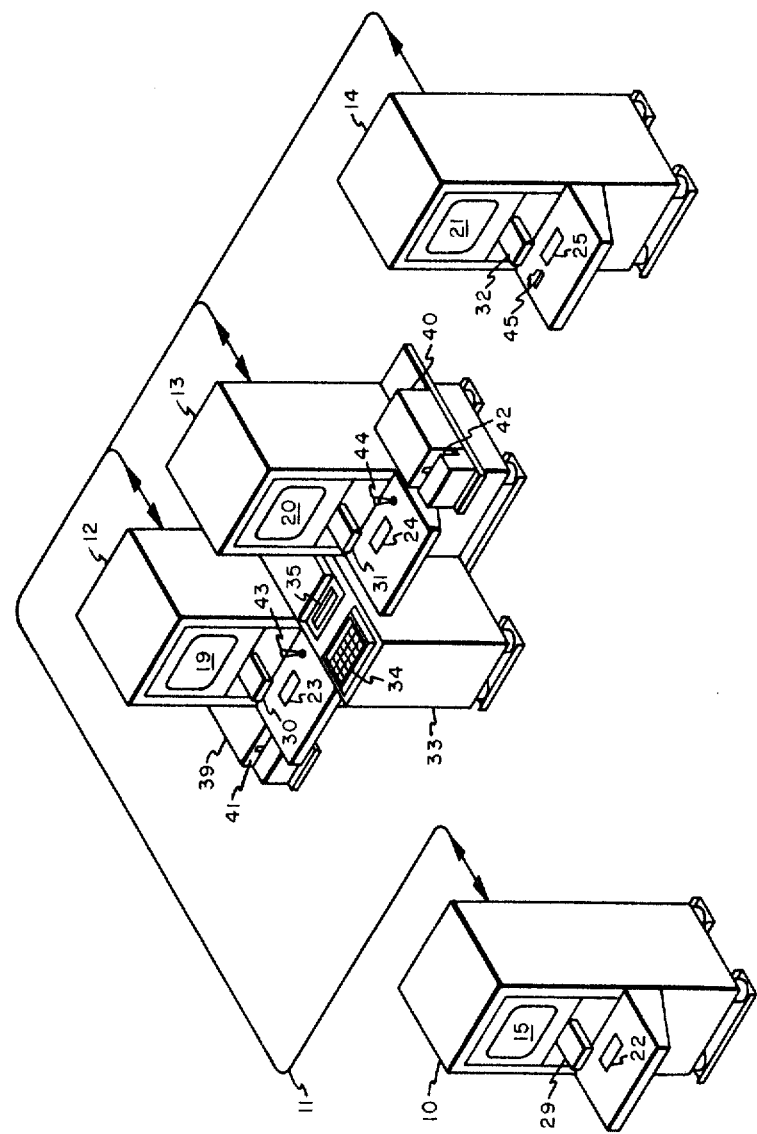
FIG. 1 is a graphic illustration of one form of the present system.

Referring to FIG. 1 more completely, one form of the present invention is illustrated in a console type data storage, retrieval and display system. The system illustrated includes a position 10, which may serve as a supervisor-observer position, for example, of which there could be more than one, by essentially duplicating the position 10 and connecting the added position or positions into the system. Positions 12 and 13 represent what may be referred to as operator positions, and position 14 represents what may be referred to as an auxiliary operator position. The several positions are interconnected by a lead 11, which may include a plurality of conductors.

Each of the positions include a visual monitoring means, such as a closed circuit television receiver, illustrated as console mounted and represented by the screens 15, 19, 20 and 21. Each position also includes a desk portion in which is mounted a variable data chip viewing plate represented by 22, 23, 24 and 25. On the face of the console, above the desk portion, a lamp is provided, the light from which may be directed onto the variable data chip viewing plate, the lamps being represented by 29, 30, 31 and 32.

Between the operator positions 12 and 13 is a data chip storage and retrieval assembly 33. The data chip storage assembly represents a storage and retrieval device which includes an address or calling means 34, which is illustrated as including a keyboard or plurality of buttons which may be pushed thereby essentially spelling out the code or index identification of the fixed data chip and/or the variable data chip desired. An example of a data chip storage and retrieval assembly which may be employed for storage and retrieval of data chips is a retrieval file, Model One, sold by The Mosler Safe Company, which is commercially available. Such device includes a storage bin for storing the data chips, a keyboard for spelling out the code or identification of the data chip desired and a "window" for manually recovering and returning the data chip to the storage bin. Although the present illustrated system includes a common data storage assembly for the two operator positions 12 and 13, obviously a system may be provided with a data chip storage assembly for each operator position or, one of the operator positions could be eliminated, if desired. It is also obvious that the various positions may be increased to include more positions than herein illustrated, by duplication of the position or positions desired, as well as duplication of any associated apparatus.

The data chip storage assembly includes a retrieval-receiving slot 35 out of which the retrieved data chip may be extended when called for and into which the data chip may be returned. The data chip storage assembly may be a very simple storage bin or assembly which may include a plurality of slots for storing the various fixed and variable data chips with a manual retrieval return arrangement or may be a highly sophisticated arrangement which may automatically select the data chip according to the address or code punched on a keyboard or the address buttons with a means for automatically inserting or positioning the chip so called for in the viewing device and a means for automatic return to storage. An example of a fully automatic device which responds to a selected actuated address, automatically recovers the data chip, from a storage bin, inserts the data chip into the receiving slot of a microtelevisor, and thereafter, upon command returns the data chip to the storage bin, is a retrieval file, Model Two, sold by The Mosler Safe Company, which is commercially available. The retrieval file, Model Two, is combined with the microtelevisor so as to provide a fully automatic data storage, data retrieval, data insertion and data recovery system operable upon actuation of the keyboard or address means.

Each of the operator positions include a fixed data chip viewer, represented by 39 and 40, each viewer having a receiving slot 41 and 42 into which the fixed data chip may be inserted. The fixed data viewer is represented to include a microtelevisor for viewing the fixed data chip which is inserted into the receiving slot. The present system is represented as a partly manual system in which the fixed data chip may be automatically retrieved in response to the address or code punched and manually inserted into the receiving slot of the fixed data viewer. However, this operation may be made in fully automatic form, if desired.

Each operator position also includes a microtelevisor control stick, represented by 43 and 44 respectively. The control stick 43 is assumed connected to the microtelevisor in fixed data chip viewer 39 and the control stick 44 is assumed connected to the microtelevisor in the viewer 40. In accordance with the circuit diagram of FIG. 5, for example, rotation of the control stick may be used as a microtelevisor magnification control while left and right movement of the control stick and forward and backward movement of the control stick may be used to position the microtelevisor so as to selectively view the total field of the fixed data chip or a selected portion of the total field, as desired.

The auxiliary position 14 represents a position which may be a plotter-position, for example. Position 14 includes a receiving slot 45, located in the desk portion of the console. The receiving slot 45 is illustrated with a card or data chip inserted therein. The microtelevisor assembly has been eliminated from position 14, although such assembly may be included therewith. In the case of position 14, the fixed data viewer may include a television camera which is substantially fixed so as to view all of the field of the fixed data chip.

The variable data chip so selected may be positioned over the variable data chip viewer and information on the chip may be viewed by a television camera, assumed included in each console and positioned so as to view the full field of the variable data chip. In accordance with the present system the variable data chip may be annotated so as to add, delete and/or change any information desired on the variable data chip. Such information contained on the chip, as well as information subsequently added will be viewed by the television camera and the image of the information on the chip will be displayed on the monitor of the console. Also the information on the fixed data chip so viewed by the microtelevisor will be displayed on the same monitor so that a composite or overlay display of both images of both forms of information may be presented.

The system shown may include an audio intercommunication system so that verbal instructions may be communicated from one position to another. Construction of such audio intercommunication system is believed obvious to those skilled in the art, and is not shown.

In accordance with the present system, the various positions are assumed interlinked so that an image of the variable data chips viewed at operator position 12 (FIG. 13), for example, may be displayed at positions 10 and 13 (or 12) as well as position 12 (or 13). The image of the variable data viewed at position 10 may be displayed at positions 10, 12 and 13 while an image of the fixed data viewed at position 12 or 13 may be displayed at position 10. Position 10 may have included therein a selector switch (not shown) for selective viewing of the image displayed at any other position. Such a selective switching system will be familiar to those skilled in its construction.

It will be noted that lead 11 shows that position 14 does not necessarily receive from positions 10, 12 and 13. However, position 14 may be interlinked in the system to so receive any display provided by other positions, if desired.

Any system having the basic characteristics and functions of the system described herein may have many modifications. The system itself may be located on land with the various consoles widely spaced, the supervisor position being placed in another room, another building or in another city from where the operator positions are located. The system may be located on or in a vehicle whether land, water or airborne or the components (positions) may be dispersed so that parts of the system are located at or in one or more of various locations or places. Since the lead 11 carries a video signal, this link may be a solid link or an air link, a transmitter being used to send a signal through air and/or a receiver for receiving the transmitted signal may be used at the appropriate positions.

If the system or a part thereof is located in a vehicle, whether land, water or airborne type, it may be preferred to provide a shock-proof mounting on which to position the console or consoles.

Figure 2:
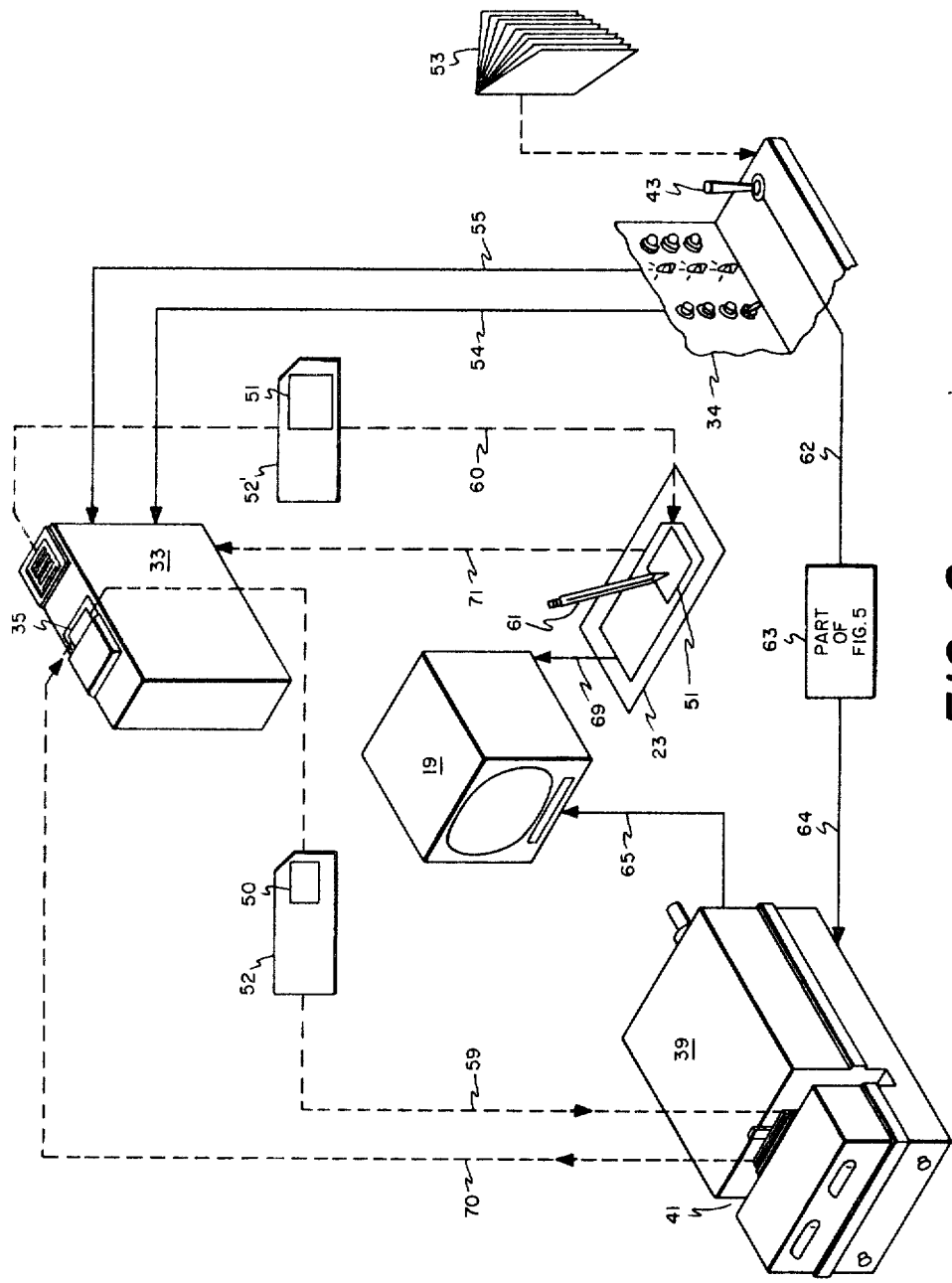
FIG. 2 is a flow diagram of the present data storage and display system.

Referring ot FIG. 2, a simplified component flow diagram of an operator position, such as position 12 in FIG. 1, is presented in which the corresponding components as between FIGS. 1 and 2 have been labeled with corresponding reference characters. The interconnecting broken lines represent mechanical or manual connections and the interconnecting solid lines represent electrical connections.

The simple arrangement in FIG. 2 assumes that the fixed data chip 50 and the variable data chip 51 may each be mounted on a card, suitable for coding and filing or storing. The coded cards 52 and 52' may be stored in a storage bin or container, represented as 33. The codes may be indexed and an index book or chart, such as 53, may be provided from which the operator may obtain the code of the fixed data chip desired. Part of the operator's control panel is shown with the control stick 43 and one form of a code address means represented as a plurality of buttons, selector switches and indicator lamps, with a master switch, represented as a toggle switch. These components, in alternate form, correspond to the keyboard arrangement 34, in FIG. 1, for selecting a data chip via an address means.

After obtaining the code designation for the fixed data chip desired, the operator would actuate the address system 34 which is assumed coupled via line 54 to the storage module or bin 33. When the card 52 is retrieved an indicator lamp may so indicate and the card on which the fixed data chip is mounted may be manually recovered and inserted into the card receiving slot 41 of the microtelevisor 39 as represented by line 59. In other arrangements retrieval and recovery may be automatic, as suggested above.

Selection of the variable data chip may be made in a manner similar to that described for selecting the fixed data chip, as represented by line 55. It will be appreciated, however, that the address of the variable data chip will include more information than the address of the fixed data chip. The address or code of the variable data chip will include the code of the fixed data chip with which it is associated, a code representing the magnification level to which the microtelevisor is adjusted for viewing the fixed data chip and a code representing the grid coordinates of the particular portion of the fixed data chip actually viewed by the microtelevisor.

In this simple arrangement the coded card 52′ may be retrieved by the storage module 33 in response to actuation of the keyboard and the card containing the variable data chip 51 may be manually recovered and positioned over the viewing plate 23, as represented by line 60. As illustrated in FIG. 2, the fixed data chip 50 may be somewhat smaller than the variable data chip 51. In some instances the fixed data chip may be the size of a frame of microfilm while the variable data chip may be a substantially larger plate or sheet so as to be conveniently annotated, as represented by the pencil 61.

A system, for example, may employ a microfilm chip as the fixed data chip and the vehicle for mounting and transporting the fixed data microfilm chip may be a standard EAM (electric accounting machine) size card which is substantially 7⅜ inches long and 3¼ inches wide. The microfilm chip may be mounted in a window of the EAM-size card which has a common location on all cards used for mounting the microfilm chip. The variable data chip may be a transparent or translucent EAM-size card or plate of suitable material such as plastic, paper, glass or any other material on which information may be placed, such as by writing with pencil, pen or crayon, for example, and from which information may be erased. When the standard EAM-size cards are employed as vehicles for the variable data an area of approximately 2¾ inches by 3⅔ inches is available for annotation.

The control stick 43 is represented as connected to the microtelevisor 39 via line 62, block 63 (which is assumed to represent part of FIG. 5, the remaining part of FIG. 5 assumed to be packaged with the microtelevisor) and line 64. This control arrangement, as seen more completely in FIG. 5 and/or FIG. 6 may be used to control the magnification level of the microtelevisor as well as position the microtelevisor to view either all or a selected part of the fixed data chip 50.

Figure 3:
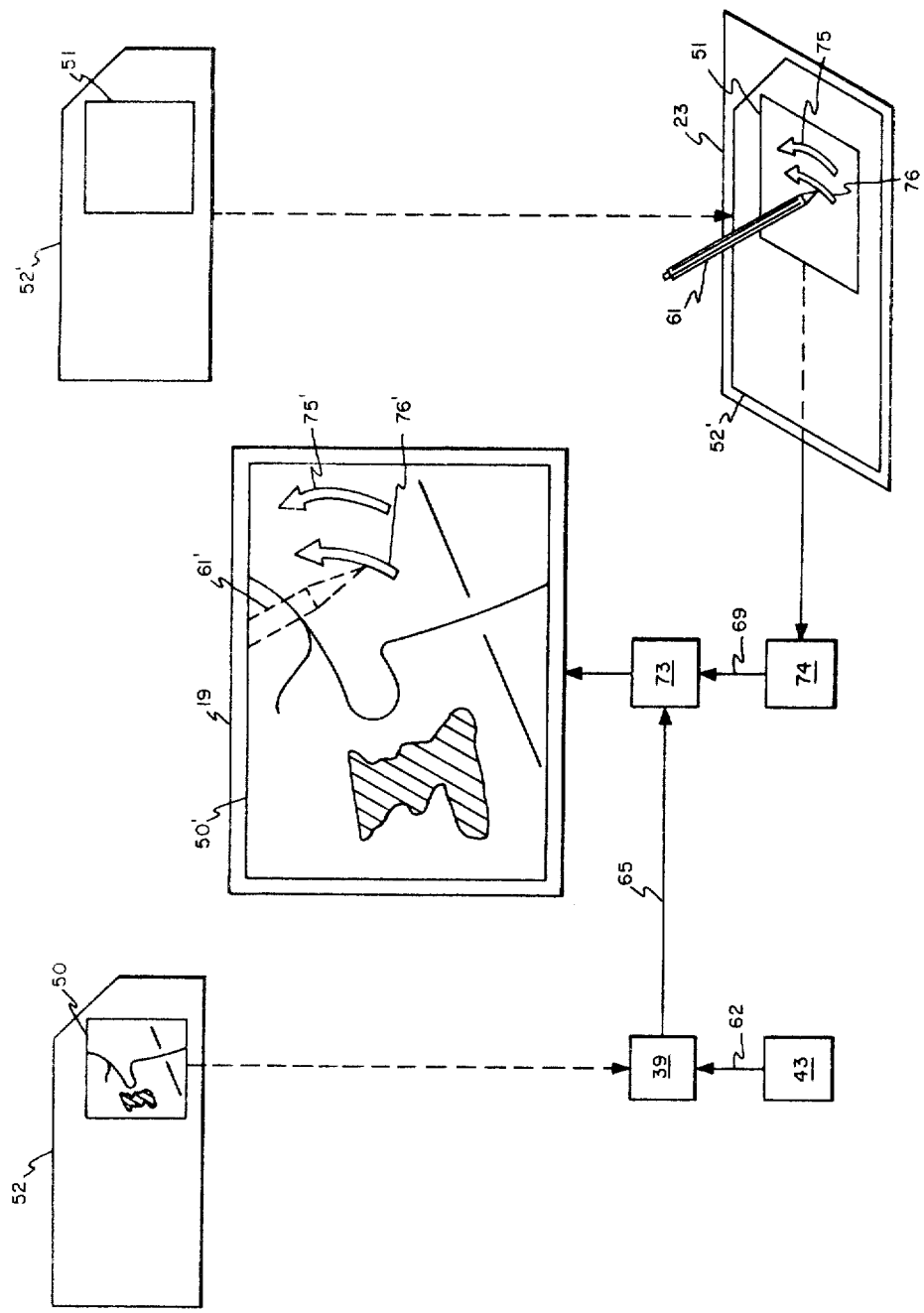
FIG. 3 is a graphic representation of the two forms of data showing the composite image display functions.

It is assumed, as shown more clearly in FIG. 3, that a television camera may be positioned so as to view the total field of the variable data chip 51 and, in accordance with established practice of video signal mixing, the video signals of both the microtelevisor and the television camera are applied via lines 65 and 69 respectively to a television monitor 19 and display in a composite image of both data chips.

The cards 52 and 52′ containing the fixed data chip and variable data chip respectively, may be returned to the storage module 33, manually, or otherwise, as represented by lines 70 and 71 respectively.

Referring to FIG. 3, a diagram is presented which diagrammatically shows, in simplified form the video (television picture or image) signal pickup, signal mixing and composite image display. As previously described the fixed data chip retaining card 52 would be positioned in the microtelevisor receiving slot and the microtelevisor 39 would view either all (here assumed to be all) or part of the fixed data information 50, according to the desire of the operator, as expressed through operation of the control stick 43 via lead 62. The video signal of the fixed data chip 50 is applied via lead 65 to a video mixer 73 and the signal of the fixed data is therefrom applied to a television monitor and appears on the screen 19 as an image represented as 50′. The variable data chip 51, when placed on the viewing plate 23, will be viewed by a television camera 74 and the signal representing the variable data (arrows 75 and 76) will be applied via lead 69 to the video mixer 73. The variable data video signal is also applied to the television monitor and the image of the variable data is superimposed on the image of the fixed data, as illustrated by arrows 75′ and 76′. The pencil, or pen, 61, is shown as a broken line image 61′ on the screen 19. Obviously, information on the variable data chip may also be erased from the chip, if desired.

Thus it may be seen that the image of the variable data may be superimposed on the image of the fixed data and presented as a composite display picture.

Figure 4A:
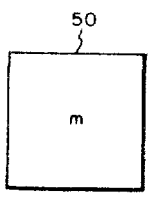
FIGS. 4a, 4b, 4c, 4d and 4e represent possible sectional views of the fixed data form.
Figure 4B:
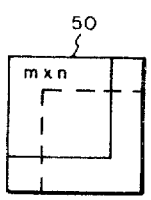
Figure 4C:
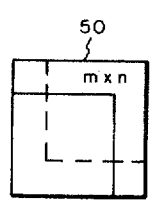
Figure 4D:
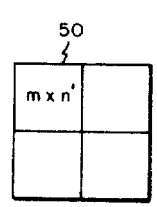
Figure 4E:
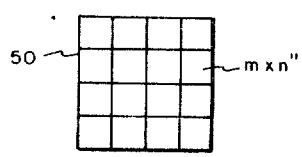

Referring to FIGS. 4a, 4b, 4c, 4d and 4e, a representation of a fixed data chip is presented in each figure as 50 and various fields of view are shown with FIG. 4a showing the total field or area of the chip may be viewed at a magnification factor $m$. FIGS. 4b and 4c show that a view of ⅔ of the total field may be made in four views at a magnification factor of $m \times n$. As previously stated there is certain overlap of information in the ⅔ field view. FIG. 4d shows the total field partitioned in ¼ sectional views and magnified $m \times n'$ while FIG. 4e shows ⅒ field sections having a magnification factor of $m \times n''$. Obviously other sectioning or partitioning of the total field may be done and grid coordinates may be used so that any particular section may be located by such coordinates, if desired.

Figure 5:
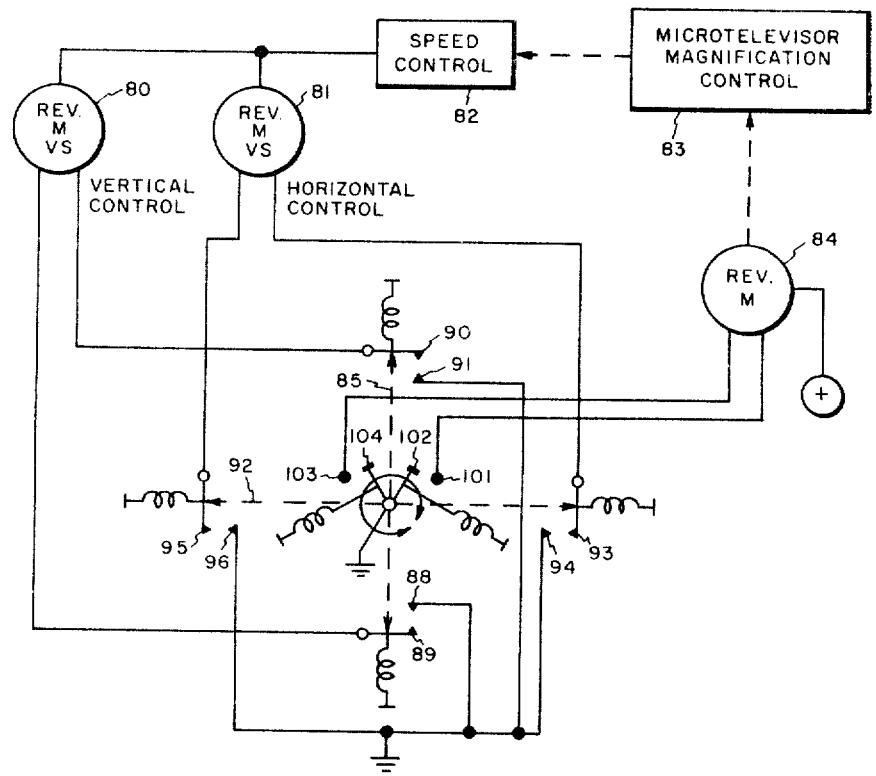
FIG. 5 is a diagram partly in block and partly in schematic form representing the control of the microtelevisor.

Referring to FIG. 5 a schematic diagram partly in circuit and partly in block form is presented representing one form of control arrangement for both positioning a microtelevisor and adjusting the magnification level of the microtelevisor.

The microtelevisor may be positioned by selective driving of reversible motors which may also be variable speed motors. One such motor 80 may position the microtelevisor vertically and a second such motor 81 may position the microtelevisor horizontally. A speed control 82 may control the speed of the positioning motors so that when a very small section is to be selected from a plurality of small sections the "sweep" of the microtelevisor across the face of the fixed data may be slow. The speed of the motors 80 and 81 is preferably adjusted so as to be inversely related to the magnification factor as selected by adjustment of the microtelevisor magnification control 83.

The motor 84 is preferably a reversible motor which drives the magnification control 83 so as to adjust the magnification level of the microtelevisor.

A circuit for controlling the motors 80, 81 and 84 is illustrated as including two oppositely actuated vertical control contacts, two oppositely actuated horizontal control contacts and two oppositely actuated magnification control contacts, with all the contacts spring-loaded so as to normally rest open. The spring-loaded contacts are actuated, i.e., closed, individually in response to movement of the control stick 43, or 44 (both in FIG. 1). Longitudinal or forward and back movement of the control stick as represented by broken line 85, so as to close contacts 88 and 89 (when moved in one direction for example, forward) and close contacts 90 and 91 (when moved in the other direction, for example, backward) will provide selective control over the vertical control motor 80. Lateral or left and right movement of the control stick, as represented by broken line 92, so as to close contact 93 and 94 (when moved to the left, for example) and close contacts 95 and 96 (when moved to the right, for example) will provide control over the horizontal control motor 81. Rotation of the control stick in a clockwise direction, so as to close contacts 101 and 102 and rotation in a counterclockwise direction so as to close contacts 103 and 104 provides control over the magnification level control motor 84.

According to direction of application of pressure on the control stick the motors 80 and 81 will position the microtelevisor so as to view a particular section of the face of the fixed data chip and according to the direction of rotation of the control stick the motor 84 will vary the magnification factor of the microtelevisor. When pressure is fully released from the control stick, all contacts will be returned to a normal open position and the microtelevisor will remain in the selected position and at the selected magnification factor or level, unless a manual start and auto-stop arrangement is used, such as described below for the magnification factor.

Figure 6:
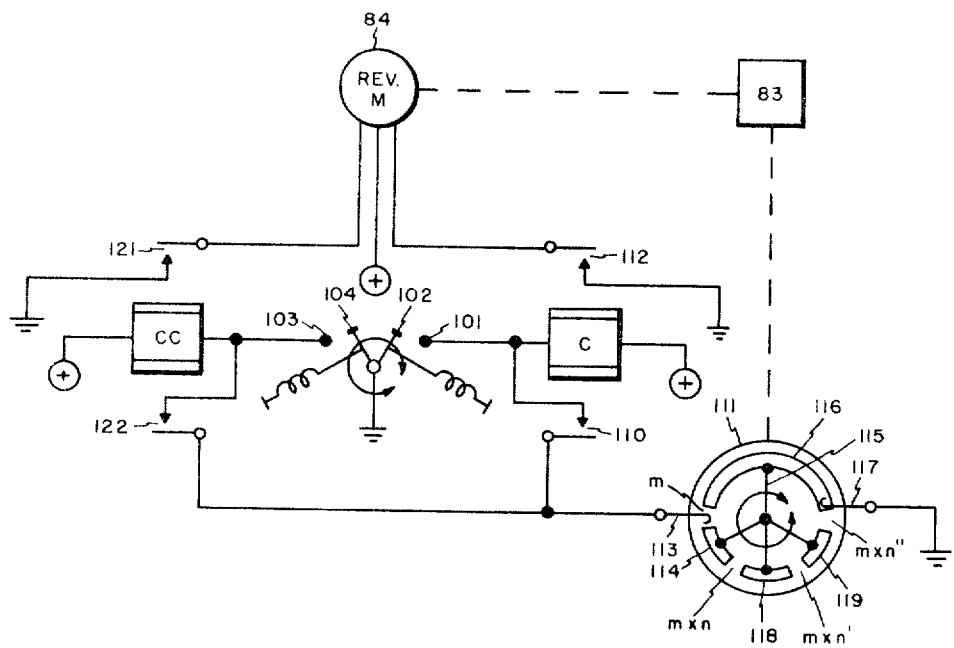
FIG. 6 is a diagram partly in block and partly in schematic form illustrating one form of automatic stop magnification control.

FIG. 6 shows a circuit arrangement which may be used to provide an auto-stop magnification level adjustment for the microtelevisor. By rotating the control stick in one direction, for example clockwise, the contacts 101 and 102 will close and complete an energizing circuit for the clockwise control relay C. Upon energization of relay C, contacts 110 and 112 will both close. Closure of contact 112 will complete a driving circuit for reversible motor 84 so as to drive the motor in a clockwise direction, for example. The motor is coupled to the magnification control 83 which includes a printed circiut 111 having a plurality of spaced segments. The printed circuit is driven in a clockwise direction and when the brush 113 contacts with the segment 114, the relay C will lock in through its own contact 110, brush 113, segment 114, lead 115, segment 116, brush 117 to ground, power being applied on the other side of the relay. The printed circuit may be so coupled and coordinated with the magnification control device so that when the printed circuit is rotated and the open (nonconductor) part between segments 114 and 118 passes under the brush 113, the lock-in energizing circuit for relay C is opened (assuming the control stick was released so that contacts 101 and 102 returned to their normally open conditon) and relay C drops out thereby opening the driving circuit for motor 84. The magnification factor of the microtelevisor has changed from $m$ factor to $m \times n$ factor, for example. The spring and size of the segments 114, 118 and 119 and the speed of rotation of the printed circuit and the magnification adjustment may be so coordinated that when brush 113 is between segments 114 and 118 the microtelevisor will magnify $m \times n$ and when between segments 118 and 119 will magnify $m \times n'$, etc. The spaces between the segments may be of such size so as to permit fine tuning of the magnification factor by operating the control stick, if desired.

Rotation of the control stick in the other direction, counterclockwise, for example, will close contacts 103 and 104 thereby energizing relay CC. Closure of contact 121 will close the counterclockwise driving circuit for motor 84 which will operate to drive the magnification control in the other direction and drive the printed circuit 111 in the counterclockwise direction and the lock-in circuit for relay CC, including contact 122, brush 13, one of the segments 114, 118 or 119, lead 115, segment 116 and brush 117 to ground will hold the relay CC energized until the printed circuit 111 revolved to where brush 113 is positioned between segments.

Such circuit arrangement, of which FIG. 6 shows one form, may provide an auto-stop magnification control for the microtelevisor. Obviously a brake may be used to reduce or eliminate any override of the motor 84, if desired.

Employing similar principles as employed in the circuit illustration in FIG. 6 for the manual start, auto-stop magnification level control, the positioning control of the microtelevisor may also be made as a manual start, auto-stop system. It may require that the positioning control be somewhat more sophisticated. However, horizontal and vertical positioning of the microtelevisor may be accomplished with a manual start, auto-stop circuit arrangement by essentially providing a programmed printed circuit, or other program device which may be responsive to the address, code or index of the variable data chip selected since this address, code or index includes the particular part or section of the fixed data chip to be viewed by the microtelevisor.

Although the present invention has been described with reference to fixed data in the form of a chip, such as a microfilm or slide and the storage module has been described as a means for storing such fixed data chip, obviously the fixed data may be in the form of a computer having a memory function and the storage means essentially would be combined in the computer. In place of the physical fixed data component, per se, a high speed printer or typing device, which would print the information called for from the memory device may be used to provide the visible physical fixed data for viewing by the microtelevisor and the textual or tabular or other information provided by the memory device through the high speed printer may be amended, modified and/or annotated through the variable data component.

When using a high speed printer in conjunction with a memory type computer or other memory device the ability to position the microtelevisor vertically finds great utility since it may be desirable to review as by re-presenting a part of the information previously presented or skipped certain of the information presented by the high speed printer.

In addition, data may be stored on the container in different colors and the viewing device, whether it be a microtelevisor, or a television camera may be made selectively sensitive to one color so as to "see" a particular color and nonsensitive to other colors and therefore not "see" the information in other colors. This may be accomplished by a color filter system associated with the viewing device. Where two or more operator positions are employed in a single system different color annotation means (such as pencils) may be used at the respective positions on the variable data chip.

Another technique which may be employed in a system employing the principles herein described, is to store information on a data container in varied size characters, i.e., general information in large characters and more detailed information in progressively smaller characters, in accordance with the degree of detail. The characters of any particular category of detail may be made of a size so that the characters are legible at a particular magnifiication level and other characters are illegible at the same magnification level. Employing this technique, information in varying degrees of detail may be placed on the same data chip and may be selectively viewed in accordance with the detail desired as controlled through the magnification level of the microtelevisor. Thus, for example, general information on a particular subject or device may be displayed from a particular data container on which full and complete information may be stored, without disclosing more detailed information which may be stored on the same data chip.

Although an arrangement of the present invention has been illustrated and described and other forms and arrangements of the components and system have been mentioned, other forms and arrangements of components and systems, as will be familiar to those skilled in the art, may be made without departing from the scope of the appended claims.

What is claimed is:

1. An information storage and display system for storing, retrieving and displaying a form of fixed data and a form of variable data in composite display including, a plurality of common forms of fixed data individually coded for identification, means for storing said fixed data forms, means for selectively retrieving a desired fixed data form in accordance with its identification code, means for selectively viewing a desired portion of said fixed data so retrieved, said viewing means including, means for providing one of a plurality of magnification levels for magnifying the fixed data so viewed in accordance with the percentage of the relation between the total field of the fixed data and the portion thereof so viewed, means for providing a first signal representative of the portion of said fixed data actually viewed and magnified, means responsive to said first signal for providing a first image of the fixed data so viewed, each said image having common dimensions, a plurality of common forms of variable data for each form of fixed data of said plurality of fixed data forms, each variable data form being coded in accordance with the identification code of the fixed data with which the variable data is related and the portion of the field of the fixed data viewed, means for storing said plurality of common forms of variable data, means for selectively retrieving one variable data form from said plurality of forms of variable data in accordance with its identification code and the level of magnification of the fixed data magnification means, means for viewing the variable data form so selected, means for providing a second signal representative of the variable data form so viewed, means responsive to said second signal for providing a second image of said variable data, said image having said common dimensions, and means for displaying said first and second images in common so that said first and second images are a composite display.

2. An information storage and display system as in claim 1 and in which said means for providing a plurality of magnification levels is a microtelevisor, and said means for viewing said variable data is a television camera.

3. An information storage and display system as in claim 1 and in which each said fixed data form is sectioned by grid coordinates and said means for selectively viewing includes, means for horizontally positioning said viewing means along said fixed data, and means for vertically positioning said viewing means along said fixed data so that a desired position of said fixed data form may be viewed as defined by grid coordinates.

4. An information storage and retrieval system as in claim 3 and in which said means for selectively retrieving said variable data form includes, means responsive to the code of a form of fixed data, means responsive to the positioning of said means for selectively viewing said fixed data, and means responsive to the magnification level provided by said magnification level providing means.

5. An information storage and display system for storing, retrieving and displaying two different forms of related data including, a first form of data having an identification code, a plurality of second forms of data, each data form of said plurality related to said first form of data and each data form of said plurality individually related to a different portion each of the total field of said first data so that at least one data form of said plurality is related to the total field of said first data and others of the said plurality are related to a different portion of the total field so that said others of said second data form relating to a common percentage of the total of said first form of data collectively include the total field of said first form, and each form of said plurality of second forms having an identification code distinctive of its relationship to said first form, means for storing said first form of data and said second forms of data, means for selectively retrieving said first form of data from said storage means in accordance with the identification code of said first data desired to be retrieved, means for selectively viewing a desired portion of said first form of data, said viewing means including adjustable means for providing one of a plurality of magnification levels for magnifying the portion of said first data so viewed, each magnification level related to the percentage of the total field of said first data so viewed, means for providing a first output signal representative of the information on a portion of said first data so viewed and magnified, display means responsive to said first output signal for providing an image of the information on said portion of said first data so viewed and magnified, each said image having common dimensions, means for selectively retrieving at least one data form of said plurality of second forms of data in accordance with the first form of data selected and the section of said first data form so viewed and said magnification level of said viewing means, means for viewing said second form of data so retrieved and for providing a second output signal representative of information on said second form so viewed, and said display means includes, means responsive to said second output signal for providing a second image of said second form of data so viewed, said second image having said common dimensions and superimposed on said first image.

6. An information storage and display system for storing, retrieving and displaying a form of fixed data and a form of variable data related to said fixed data, in composite display including, a form of fixed data indexed for storing, said fixed data being partitioned in sections by grid coordinates, a plurality of variable data forms indexed for storing, said plurality equal in number to the sections formed by the grid coordinates, plus one, means for storing said fixed data and said variable data forms, means for retrieving said fixed data according to the index of the desired fixed data, a microtelevisor having a plurality of magnification levels including, means for receiving a fixed data form, means for viewing a desired portion of said fixed data form so inserted in said receiving means at a desired magnification, means for adjusting the magnification level of said viewing means, means for positioning said viewing means so as to view a desired portion of said fixed data and means responsive to so viewing for providing a first video signal representative of the informtaion on the portion of said fixed data so viewed, means for retrieving a selected form of variable data in accordance with the fixed data form so retrieved, the portion of said fixed data so viewed and the magnification level at which said viewing means is adjusted, means for viewing the variable data form so retrieved and for providing a second video signal representative of the information on the variable data form so viewed, means for mixing said first and second video signals, and means for displaying said mixed signals for providing a composite image of said fixed data portion so viewed and said variable data so viewed.

7. An information storage and display system as in claim 6 in which said form of fixed data is a microfilm and said variable data form is a transparent plate, and said variable data transparent plate is annotatable.

8. An information storage and display system as in claim 6 and in which said means for viewing a desired portion of said fixed data form includes, adjustable means for adjusting said viewing means for viewing various percentages of the total field of said fixed data form, and means coupling said adjustable means and said magnification level adjusting means for magnifying the portion of said fixed data so viewed to a level of magnification of said plurality of levels in accordance with the percentage of the total field of said fixed data so viewed.

9. An information storage and display system as in claim 8 and in which said means for positioning includes,
first drive means for horizontally positioning said viewing means along said fixed data form and
second drive means for vertically positioning said viewing means along said fixed data form and said system further includes,
speed control means for controlling the speed of said first and second drive means in accordance with the magnification level of said viewing means.

10. An information storage and display system as in claim 6 and in which the portion of a fixed data form viewed is defined by grid coordinates and said means for retrieving a selected form of variable data includes,
means for indicating the grid coordinates of the portion of fixed data form so viewed,
means for indicating the fixed data form so retrieved, and
means responsive to said means for adjusting the magnification level for indicating the percentage of the total field of the fixed data within said grid coordinates.

References Cited
UNITED STATES PATENTS

| | | | |
|---|---|---|---|
| 2,938,949 | 5/1960 | Vosburgh et al. | 178—6.8 |
| 3,036,291 | 5/1962 | Whittle et al. | 340—172.5 |

ROBERT C. BAILEY, *Primary Examiner.*

O. E. TODD, JR., *Assistant Examiner.*